March 17, 1959

A. E. CLITTY 2,877,608

COMBINATION MILLING AND GRINDING
ATTACHMENT FOR DRILL PRESSES

Filed March 31, 1958

INVENTOR.
ALBERT E. CLITTY
BY
Carl Miller
ATTORNEY

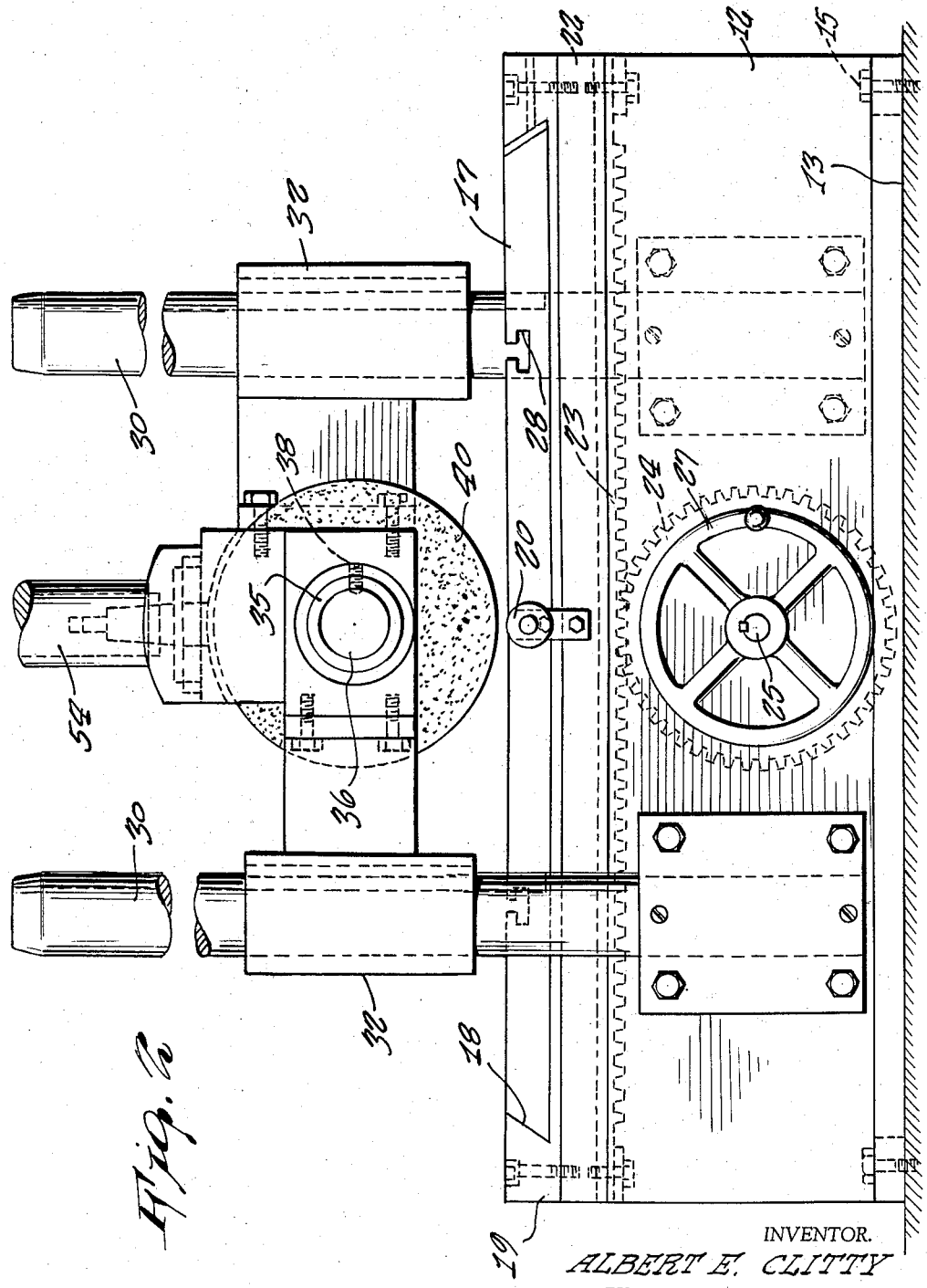

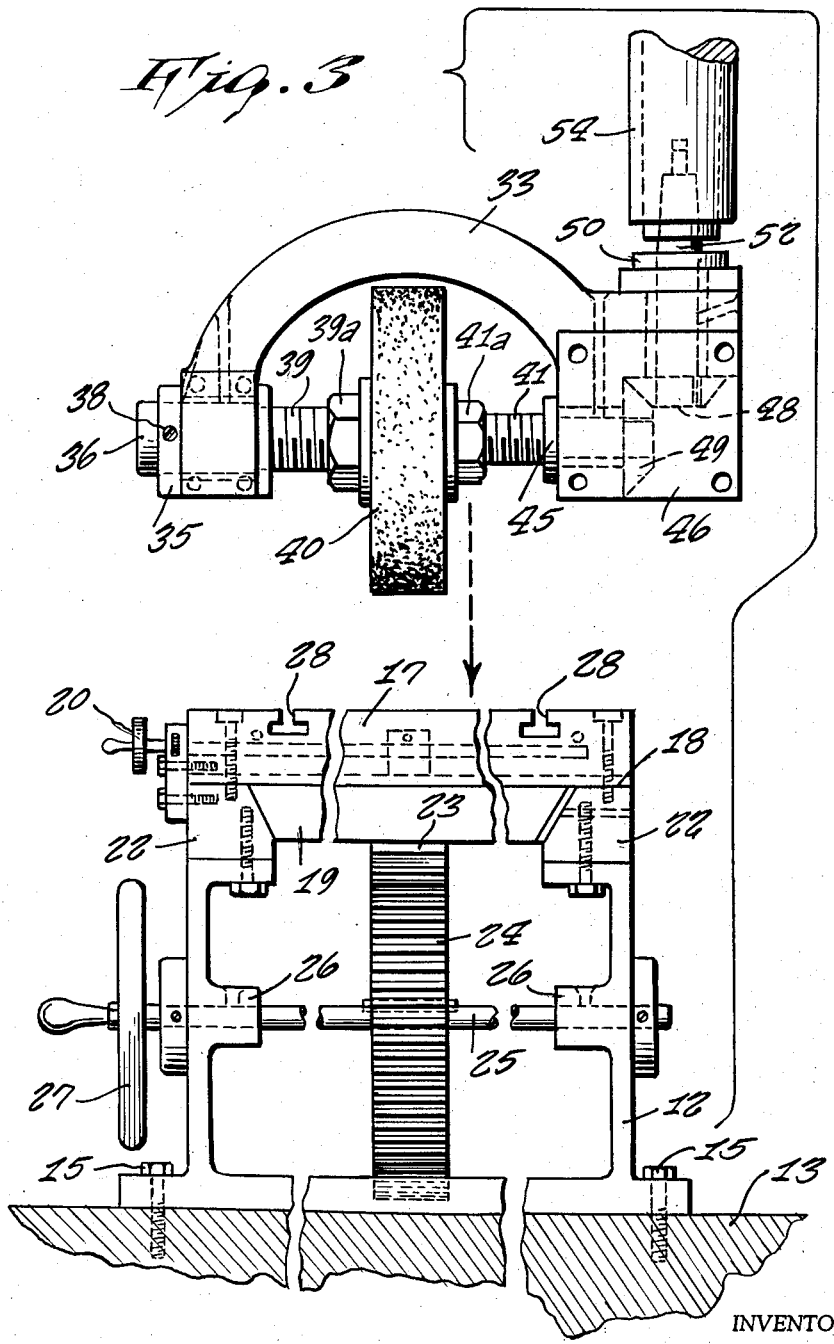

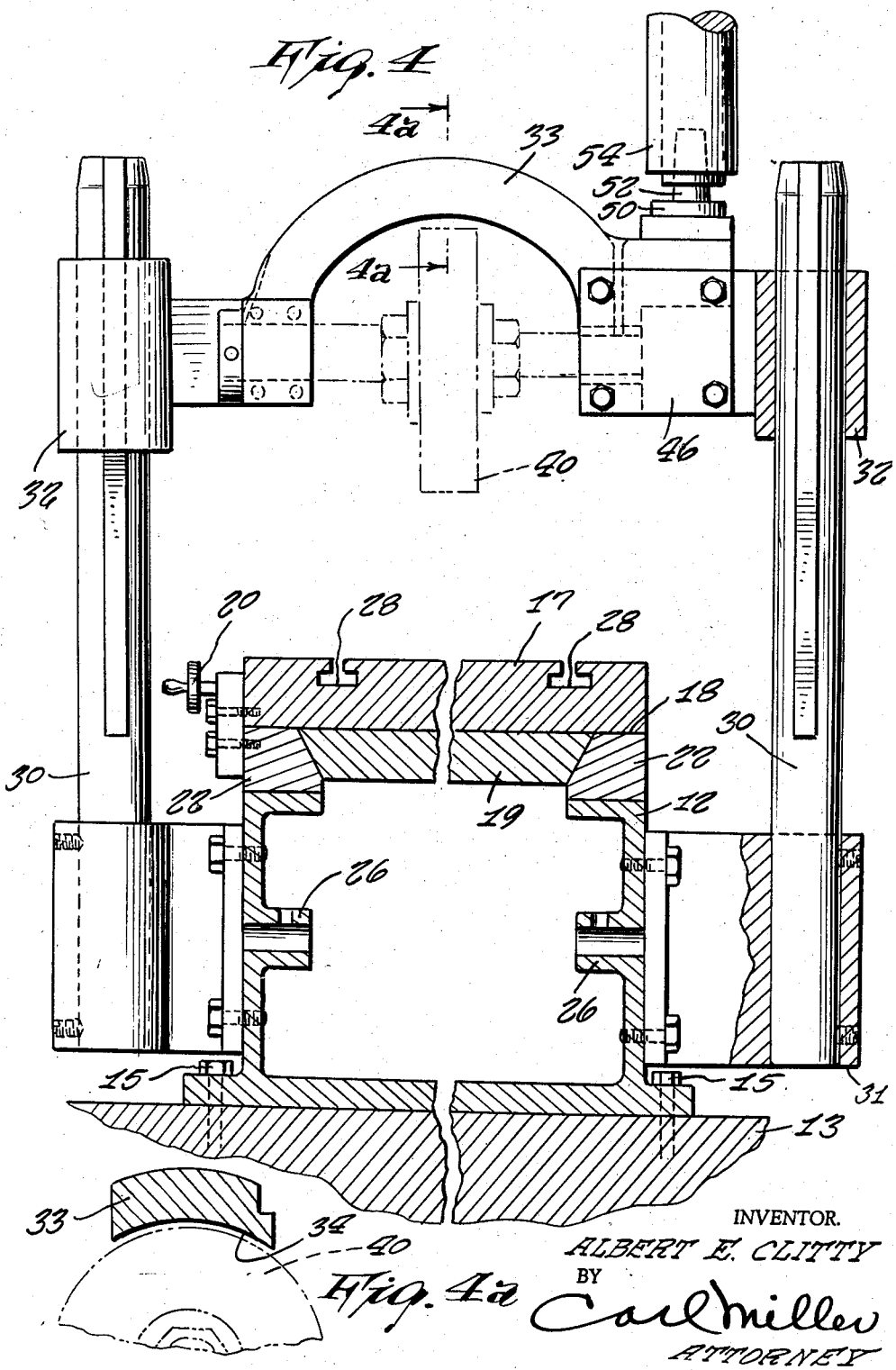

March 17, 1959
A. E. CLITTY
2,877,608
COMBINATION MILLING AND GRINDING
ATTACHMENT FOR DRILL PRESSES
Filed March 31, 1958
5 Sheets-Sheet 5
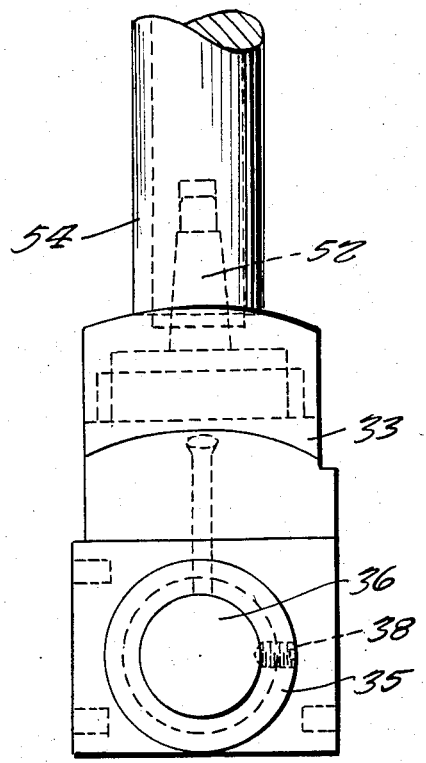
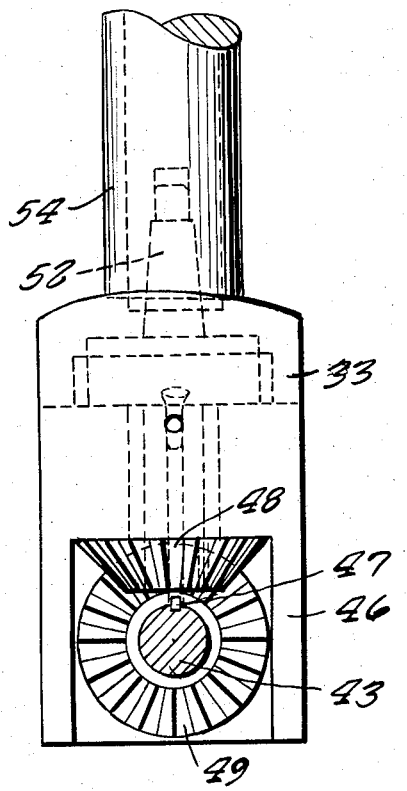
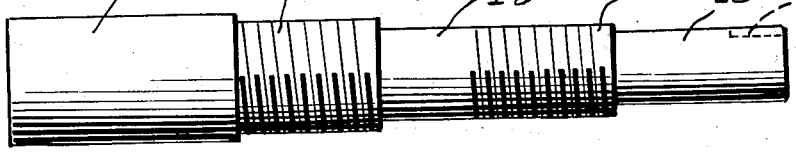
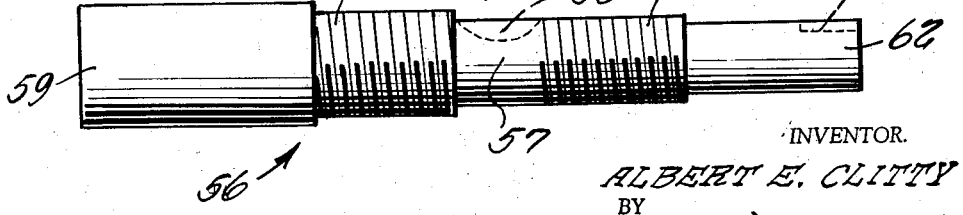
INVENTOR.
ALBERT E. CLITTY
BY
Carl Miller
ATTORNEY

United States Patent Office 2,877,608
Patented Mar. 17, 1959

2,877,608

COMBINATION MILLING AND GRINDING ATTACHMENT FOR DRILL PRESSES

Albert E. Clitty, White Plains, N. Y.

Application March 31, 1958, Serial No. 725,222

7 Claims. (Cl. 51—241)

This invention relates to machine tools and, more particularly, to an attachment for drill presses.

Ordinarily, completely separate equipment is required for milling and grinding operations, whereby the expense of having such equipment in a home workshop becomes somewhat prohibitive. It is an object of the present invention, however, to provide an attachment for drill presses which will provide for milling and grinding operations with a minimum amount of additional equipment and at a nominal additional cost.

Still another object of the present invention is to provide a combination milling and grinding attachment for drill presses which is completely adjustable, readily manipulated, and which is capable of precision performance.

Still a further object of the present invention is to provide a combination milling and grinding attachment for drill presses that can be readily incorporated in new production models of drill presses or added to existing models without affecting the normal operation of the conventional drill press functions.

Still a further object of the present invention is to provide a combination milling and grinding attachment for drill presses of the type described which can be manufactured in large quantities at a relatively low cost.

All of the foregoing and still further objects and advantages of this invention will become apparent from a study of the following specification, taken in connection with the accompanying drawing, wherein:

Figure 2 is a front elevational view of the apparatus shown in Figure 1;

Figure 3 is an end view of the apparatus shown in Figure 2;

Figure 4 is a transverse cross sectional view taken along line 4—4 of Figure 1;

Figure 4a is a fragmentary cross sectional view taken along line 4a—4a of Figure 4;

Figure 5 is a left end view of a support arch forming a part of the present invention;

Figure 6 is a right end view of the arch forming a part of the present invention;

Figure 7 is a side elevational view of a grinding wheel support shaft forming another part of the present invention; and Figure 8 is a view similar to Figure 7, showing a milling cutter support shaft forming another part of the present invention.

Figure 1:
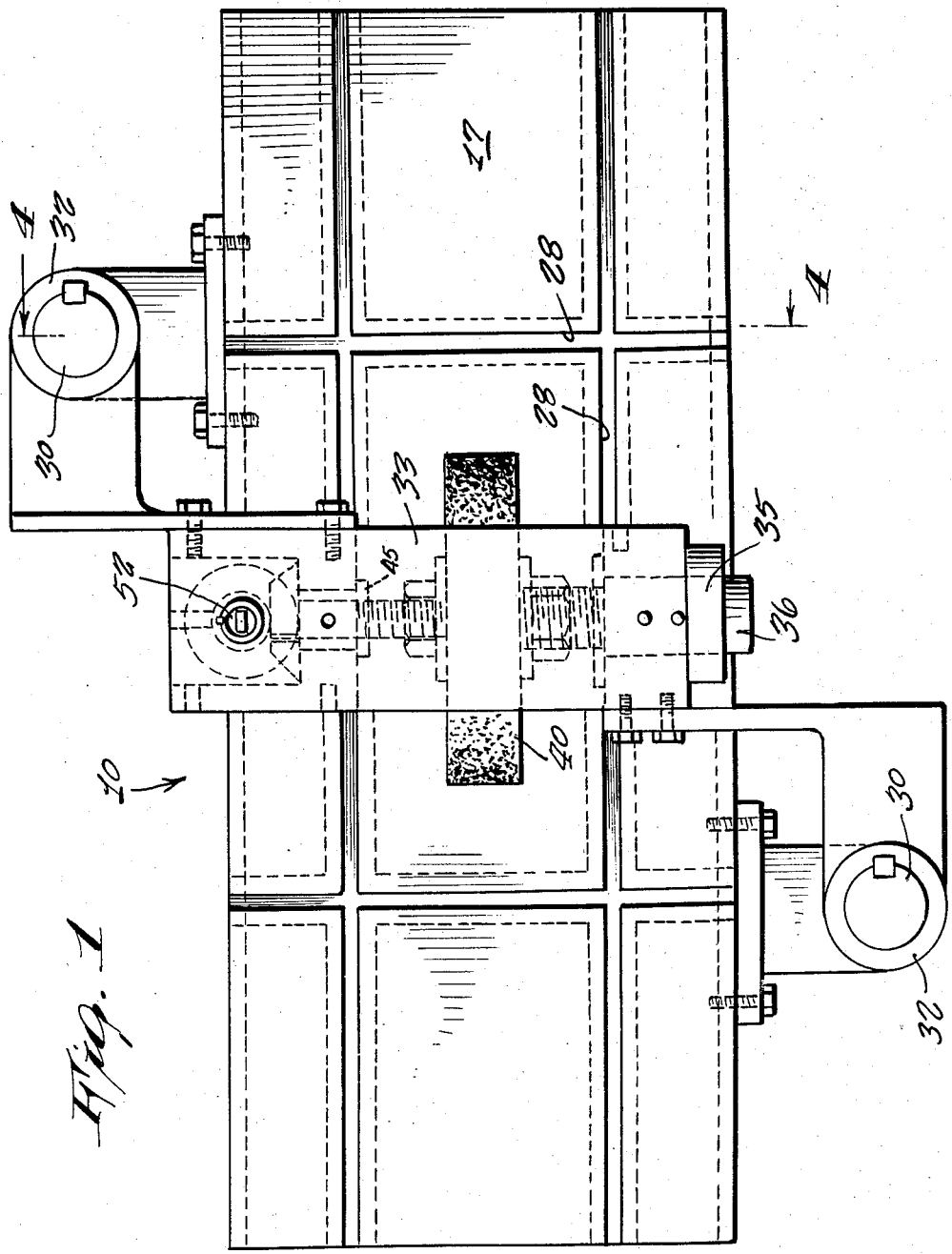
Figure 1 is a plan view of a milling and grinding attachment made in accordance with the present invention.

Referring now to the drawing, and more particularly to Figures 1 to 4 thereof, a grinding and milling attachment 10 made in accordance with the present invention is shown in operative association with a conventional drill press. This attachment includes a rigid base 12 that is adapted to be secured to the drill press work table 13, such as by bolts 15. The base 12 has longitudinal ways 22 that slidably support a carriage 19 for reciprocating longitudinal movement. This carriage 19 has a transversely extending slot 18 within which a work support table 17 is slidably supported for reciprocating transverse movement. A manually operated adjustment wheel 20 provides means for accurately adjusting the transverse position of the work table 17 relative to the working parts of the attachment, which will be further hereinafter described.

A rack gear 23 is secured to the bottom surface of the carriage 19, with which a pinion 24 is meshingly engaged. This pinion 24 is secured to the center of a transverse shaft 25 rotatably supported upon bearings 26 of the base 12. One end of the shaft 25 is provided with a handle 27, whereby rotation of the handle 27 is operative to rotate the pinion 24 so as to reciprocate the rack gear and carriage 19 in a longitudinal direction to effect adjustment of the position of the work table. This work table may also be provided with longitudinally and transversely extending T-slots 28 for securing the work upon the upper surface of the table in operative association with a grinding wheel or milling cutter as will be hereinafter explained.

A pair of support posts 30 are secured to opposite sides of the base 12 and extend in a direction normal to the plane of the surface of the work table 17. A rigid downwardly concave arch 33 is provided with sleeves 32 that slidably receive the upwardly extending posts 30, whereby the arch may be moved to any desired vertical position relative to the work table 17. This arch 33 supports the cutting tools for working engagement with the work piece that is secured to the work table 17.

One end of the arch 33 is provided with a bearing 35 through which a cutting tool support shaft 36 may be extended. As is clearly shown in Figures 1 and 3 of the drawing, the grinding wheel support shaft 36 has a central portion 42 upon which the grinding wheel 40 may be secured by means of clamping lock nuts and washers. One such lock nut and washer 39a is secured upon a threaded portion 39 of the shaft, while the other lock nut and washer 41a is threadingly secured upon a reduced threaded section 41 at the opposite side of the center portion 42. The smaller end 43 of the shaft has a keyway 44 that is adapted to slidably receive a portion of the key 47 secured to the collar of a driven bevel gear 49 forming a part of a gear drive unit 46. Because of the fact that the bearing 35 can accommodate the largest part of the shaft 36, the smaller end 43, threaded portions 41, 39, and center portion 42 of the shaft may be readily extended across the arch through the bearing 35 and into the gear drive unit 46, whereby the key 47 drivingly connects the shaft for rotation with the driven gear 49. A set screw 38 secures the shaft 36 against longitudinal movement relative to the arch 33 after the parts have been assembled.

With further reference now to Figure 6 of the drawing, it will be noted that the gear unit 46 also includes a bushing 45 that is associated with the driven gear 49 and which rotatably receives the smaller end 43 of the tool support shaft. A driving bevel gear 48 is also rotatably supported upon the gear unit 46 in driving meshing engagement with the driven gear 49. An upwardly tapered shank 52 extends through a thrust bearing 50 of the gear unit 46 and is drivingly connected to the driving gear 48. The outwardly extending tapered shank 52 is adapted to be secured within the spindle 54 of the drill press for transmitting power from the drill press motor to the tool supported upon the shaft carried by the arch 33.

In actual use, the grinding wheel 40 may be secured upon the arch 33 for a grinding operation by first inserting the shaft 36 through the enlarged bearing 35, whereupon the lock nuts, washers, and grinding wheel are assembled upon the shaft before the smaller end thereof is extended into engagement with the key 47 of the driven gear 49. After the parts have been completely assembled, the set screw 38 is used to lock these parts in place. The work piece is then clamped upon the work table 17 and the spindle 54 of the drill press is connected to the shank 52. By then energizing the drill press motor, the grinding wheel 40 will be rotated through the gear unit so as to enable the work piece to be worked upon in response to actuation of the carriage and work table through the manually operated adjustment wheels, 20, 27. Vertical adjustment of the grinding wheel 40 is effecting through the drill press feed handle or drill press feed worm wheel, as the case may be.

In order to change the unit into a milling attachment, it is only necessary to remove the grinding wheel and grinding wheel support shaft 36. By then inserting the milling cutter support shaft 56 illustrated in Figure 8 of the drawing, the milling cutter may be used to mill the work piece in a manner similar to that hereinbefore explained in connection with the grinding wheel. This shaft 56 has a central bearing portion 57, a keyway 58 being provided therein for receiving a Woodruff key that is ordinarily associated with such milling cutters. This shaft has a large end 59 for engagement within the bearing 35 at one end of the arch 33, and a smaller diameter end 62 which is provided with a keyway 63 for insertion into the driven gear 49 at the opposite end of the arch. Threaded shaft portions 60, 61 at opposite sides of the central bearing portion 57 threadingly support lock nuts and washers for clamping the milling cutter in place. After the milling cutter and support shaft have been inserted into the rigid arch 33, the machine is then ready for use as a milling attachment merely by supplying driving power thereto from the spindle 54 of the drill press.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A grinding and milling attachment for drill presses comprising, in combination, a rigid base, fastening means for securing said rigid base to the table of a drill press, a work support adjustably carried upon said rigid base, a rigid arch, guide means adjustably supporting said arch upon said base for movement in a direction normal thereto, a machine tool, bearing means rotatably supporting said machine tool upon said arch for rotation within a plane lying normal to the surface of said work table, gear drive means drivingly connecting said tool to the spindle of the drill press, said work support comprising a carriage slidably carried upon said base for reciprocating longitudinal movement in a direction parallel to the plane of rotation of said tool, manually operated gear means for selectively reciprocating said carriage, a table slidably supported upon said carriage for reciprocating transverse movement, and manually operated means for selectively reciprocating said table.

2. An attachment as set forth in claim 1, wherein said guide means comprises a pair of upstanding posts extending normal to said work support secured to said base, and a pair of sleeves secured to said arch each slidably receiving one of said posts.

3. An attachment as set forth in claim 2, wherein said machine tool comprises a shaft, a circular cutting tool secured to the central portion of said shaft, and the ends of said shaft being rotatably carried by said bearing means at opposite ends of said arch.

4. A grinding and milling attachment as set forth in claim 3, wherein said drive means comprises a pair of meshing bevel gears, one of said bevel gears having key means slidably receiving one end of said shaft, and a tapered shank secured to the other one of said bevel gears for connection to said drill press spindle.

5. A grinding and milling attachment as set forth in claim 4, wherein said one end of said shaft includes positive drive means for connection to one of said bevel gears.

6. A grinding and milling attachment as set forth in claim 5, wherein said manually operated gear means for reciprocating said carriage comprises a rack gear secured to the lower surface of said carriage, and a pinion in meshing engagement with said rack gear rotatably supported upon said base.

7. A grinding and milling attachment as set forth in claim 6, wherein said rigid arch is downwardly concave longitudinally and transversely of said work support.

References Cited in the file of this patent

UNITED STATES PATENTS

| | | |
|---|---|---|
| 1,628,975 | Hawkins | May 17, 1927 |
| 2,489,102 | Moore | Nov. 22, 1949 |
| 2,519,542 | Carey | Aug. 22, 1950 |
| 2,816,405 | Barany | Dec. 17, 1957 |